United States Patent [19]
Vardey

[11] 4,315,497
[45] Feb. 16, 1982

[54] HOLLOW HEAT EXCHANGER TILE
[76] Inventor: Lewis Vardey, 33, Lower Rd., Leatherhead, Surrey, England
[21] Appl. No.: 185,607
[22] Filed: Sep. 9, 1980
[30] Foreign Application Priority Data
 Sep. 14, 1979 [GB] United Kingdom ............... 31992/79
[51] Int. Cl.³ ............................................... F24J 3/02
[52] U.S. Cl. ..................................... 126/416; 4/493; 126/445; 126/DIG. 2
[58] Field of Search ................ 165/170; 126/444, 445, 126/DIG. 2, 415, 416; 52/306, 307; 4/493

[56] References Cited
U.S. PATENT DOCUMENTS

| | | | |
|---|---|---|---|
| 4,004,380 | 1/1977 | Kwake | 126/416 |
| 4,007,728 | 2/1977 | Guba | 126/445 |
| 4,022,187 | 5/1977 | Roberts | 126/415 |
| 4,052,974 | 10/1977 | Vataru | 126/444 |
| 4,153,037 | 5/1979 | Isaacson | 165/170 |
| 4,173,969 | 11/1979 | Scholl | 165/170 |
| 4,184,543 | 1/1980 | Kleine et al. | 126/444 |
| 4,203,421 | 5/1980 | Bencic | 126/444 |
| 4,210,122 | 7/1980 | Artweger | 126/DIG. 2 |
| 4,211,213 | 7/1980 | Nissen | 126/444 |
| 4,228,790 | 10/1980 | Davison et al. | 126/444 |

Primary Examiner—Daniel J. O'Connor
Attorney, Agent, or Firm—Toren, McGeady & Stanger

[57] ABSTRACT

A hollow heat exchanger tile (T) made of synthetic plastics material has a liquid inlet (5) and a liquid outlet (6) at peripherally spaced edge parts of a chamber (3) having a floor which rises towards the center of the tile and is shaped to promote liquid flow in a curved path between the inlet and the outlet. The tile is characterized in that the radially inward part of the chamber has at least one flared-ended hollow column (4) extending between the top and bottom surfaces of the tile and that one or other of the inlet or the outlet of the tile is formed by a tubular projection (6) from the edge of the tile.

11 Claims, 5 Drawing Figures

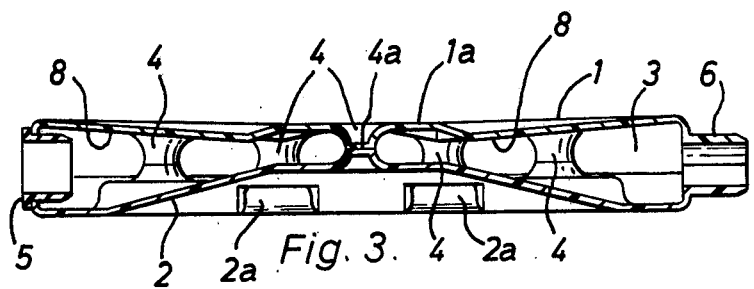
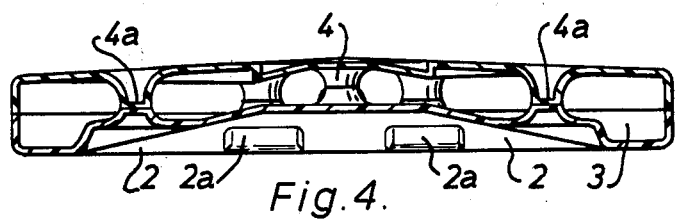
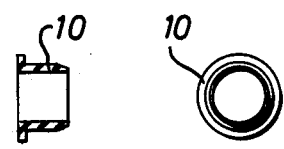

HOLLOW HEAT EXCHANGER TILE

This invention relates to a hollow heat exchanger tile mainly intended for use in solar heating installations and in particular that which has been disclosed by my British Patent Specification No. 1,328,372 which relates to a solar heating method and solar heating installation for heating water in swimming pools.

A known form of hollow tile for use as aforesaid has been disclosed in my British Patent Specification No. 1,434,974 and is made of synthetic plastics material by a blow moulding process. This tile is intended to be laid on the ground and has a central chamber having a floor which rises towards the centre of the tile and is shaped internally to promote liquid flow in a curved path between a liquid inlet and a liquid outlet at peripherally spaced edge parts of the chamber. In use a number of these tiles are arranged along side each other in a location where they are exposed to solar radiation, with the respective inlets and outlets of the adjoining tiles aligned and coupled with one another to provide a continuous heat exchanging water flow channel coupled to a swimming pool.

Although hollow tiles constructed as described above have proved reasonably efficient in operation, a production disadvantage has been that a top shallow pyramidal or convex top wall of the tile could not be kept clear of the similar but more acutely shaped bottom wall of the tile and would tend to touch and bond with it in the centre. This in turn tended to lower the centre of the top wall which in turn resulted in:

(a) formation of air pockets around the higher outer edges, and (a) due to internal joining of the upper and lower walls, formation of an internal wedge-shaped space wherein water pressure developed to such an extent as to produce fractures in the material at extreme stress points.

It has also been found disadvantageous in practice to use a tubular plug which is insertable into aligned inlet and outlet holes of adjoining panels. In particular drilling of two holes and fitting of the plugs has proved to be time-consuming in both manufacture and assembly. Also this mode of coupling adjoining tiles has not proved entirely leakproof.

The general object of the present invention has been to devise an improved hollow heat exchange tile which is of improved efficiency, structure and reliability by avoiding these disadvantages.

In accordance with the present invention therefore a hollow heat exchanger tile made of synthetic plastics material has a liquid inlet and a liquid outlet at peripherally spaced edge parts of a chamber having a floor which rises towards the centre of the tile and is shaped to promote liquid flow in a curved path between the inlet and the outlet, and is characterised in that the radially inward part of the chamber forms has at least one flared-ended hollow column extending between the top and bottom faces of the tile and that one or other of the inlet or the outlet is formed by a tubular projection from the edge of the tile.

Preferably the top wall of the tile is corrugated so as to define grooves in the top surface of the tile which may extend radially of the tile. Preferably also the grooves are of V-shaped cross-section and are of increasing width towards the centre of the tile. Preferably also the top surface of the tile has local protuberances or blisters for providing a secure foothold and for a purpose which will hereinafter be explained.

One particular and at present preferred form of hollow heat exchange tile in accordance with the invention is hereinafter described in detail by reference to the accompanying drawings in which:

FIG. 3 is a cross-section of the hollow tile on line 3—3 of FIG. 1;

FIG. 4 is a cross-section of the hollow tile on line 4—4 of FIG. 1; and

FIG. 5 is a diametric section and end view of a sleeve for use with the hollow tile as shown in FIGS. 1 to 4.

Figure 1:
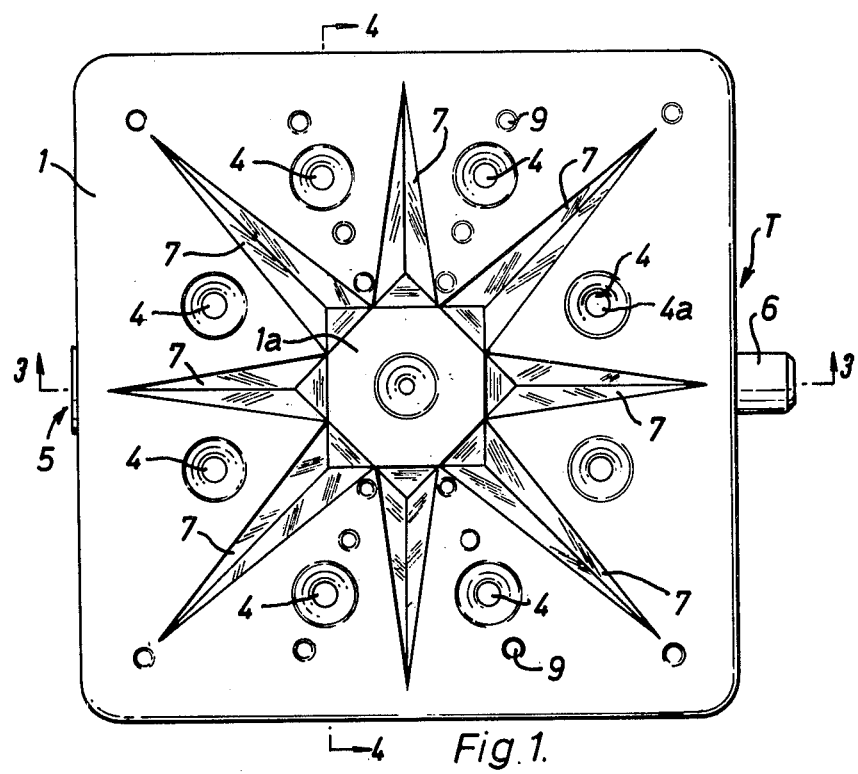
FIG. 1 is a plan view of the hollow tile.

Referring not to the drawings, the hollow tile T is made of high density polythene incorporating carbon black for ultra-violet radiation protection. It is of square shape with rounded corners and may conveniently measure about 22 centimeters by 22 centimeters with a maximum overall depth of about 32 millimeters and a maximum wall thickness of about 3 millimeters. The tile has a cranked and corrugated top wall 1 with a square-shaped central plateau 1a and a bottom wall 2 of shallow pyramidal shape. The top and bottom walls merge smoothly into one another by means of 5 millimeter radius curves to avoid stress points and together define a flow chamber 3. The central part of the flow chamber includes a series of nine load-bearing columns 4 which strengthen the tile and ensure that the top wall of the tile is always maintained at the same distance from the bottom wall of the tile irrespective of changes in pressure applied internally or externally of the tile. These columns are flared at their ends where they merge with the top and bottom walls 1, 2 in order to avoid sharp stress areas. In section the columns are hollow except for a necessary thin cross-membrane 4a at their midpoint where a moulding tool has operated. These membranes 4a can however easily be penetrated by screws or bolts to be used for fixing tiles to a base, or pushed through with a pointed implement to allow rain water or pool splashes to drain away. At the centre of one side, the tile has an inlet opening 5 whilst at the centre of the opposite side of the tile there is an outlet opening leading into a tubular portion 6.

As shown in FIG. 1, the top wall of the tile is corrugated in order to improve the load bearing strength of the tile. The corrugations define a series of eight radially directed V-section grooves 7 in the top surface of the tile. These grooves increase in width towards the central plateau 1a and function to augment the radiation receiving top surface of the tile. The corrugations also define counterpart ridges 8 on the inside of the top wall which augment the surface area available for heat exchange to the water flowing through the chamber 3.

The top surface of the tile is also formed with a multiplicity of low protruberances or blisters 9 which, together with the grooves 7, serve to provide a secure foothold when the tile is in use. These blisters 9 have a secondary function in that they conceal tubular vents provided in the forming tool to allow for dispersion of steam and condensation in the heating and cooling stages of moulding the tile.

Figure 2:
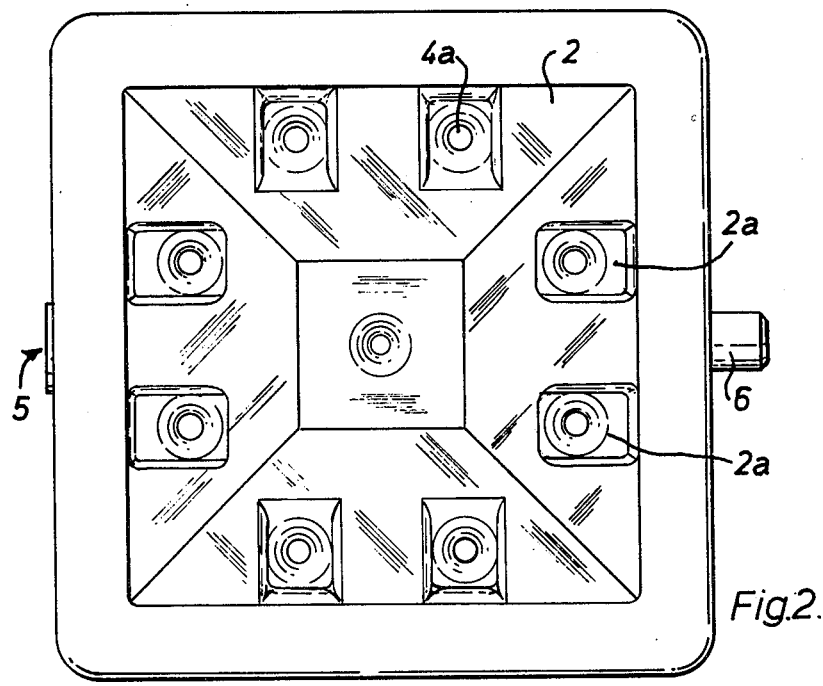
FIG. 2 is an inverted plan view of the same tile.

As can be seen from FIG. 2 the hollow load-bearing columns 4 terminate in rectangular recesses 2a in the bottom wall 2, the walls of these recesses serving to give support to the bases of the columns to accept the weight of users walking or sitting on the tiles when used as a terrace or as as surround for a pool.

FIG. 5 shows details of a flexible grommet or sleeve 10 which is made of black polyvinyl chloride having a shore hardness of 55° which is intended to be inserted into the inlet 5 prior to the insertion of the tubular portion 6 of an adjoining tile. In this manner a water-tight joint between adjoining tiles can be quickly and easily formed.

I claim:

1. A hollow heat exchanger tile means for solar heating a swimming pool made of synthetic plastics material having a liquid inlet and a liquid outlet at peripherally spaced edge parts of a chamber having a floor which rises towards the centre of the tile and is shaped to promote liquid flow in a curved path between the inlet and the outlet, characterised in that the radially inward part of the chamber has at least one flared-ended hollow column extending between the top and bottom faces of the tile and that one or other of the inlet or the outlet is formed by a tubular projection from the edge of the tile.

2. A hollow heat exchanger tile in accordance with claim 1 wherein a plurality of said hollow columns is located in a circular configuration around the chamber.

3. A hollow heat exchanger tile in accordance with claim 1 or claim 2 wherein the top wall of the tile is corrugated so as to define grooves in the top surface of the tile.

4. A hollow heat exchanger tile in accordance with claim 2 wherein the grooves extend radially relative to the centre of the tile.

5. A hollow heat exchanger tile in accordance with claim 4 wherein the grooves are of V-shaped cross-section.

6. A hollow heat exchanger tile in accordance with claim 2 wherein the grooves are of increasing width towards the centre of the tile.

7. A hollow heat exchanger tile in accordance with claim 1 wherein the top surface of the tile has local protuberances.

8. A hollow heat exchanger tile in accordance with claim 1 wherein the or each hollow column terminates in a recess in the base of the tile, the walls of such recess serving to give support to such columns when weight is applied to the top of the tile.

9. A hollow heat exchanger tile in accordance with claim 1 having its top surface formed with a central plateau.

10. A hollow heat exchanger tile in accordance with claim 1 wherein the underside of the top wall of the tile is formed with ridges.

11. A hollow heat exchanger tile in accordance with claim 1 in combination with a sleeve of flexible material which is fitted to the tubular portion for the purpose of forming a water-tight joint with an inlet or outlet opening in an adjoining tile.

* * * * *